United States Patent
Mariasis et al.

(10) Patent No.: US 7,687,936 B2
(45) Date of Patent: Mar. 30, 2010

(54) AUDIO AND VIDEO BACK-UP POWER BLOCK

(75) Inventors: Dennis I. Mariasis, Hanover, IL (US);
James C. Folk, St. Joseph, MI (US);
Paul J. Dickerson, Hinsdale, IL (US)

(73) Assignee: Trippe Manufacturing Co., Chicago, IL (US)

( * ) Notice: Subject to any disclaimer, the term of this patent is extended or adjusted under 35 U.S.C. 154(b) by 61 days.

(21) Appl. No.: 12/053,081

(22) Filed: Mar. 21, 2008

(65) Prior Publication Data
US 2009/0236913 A1 Sep. 24, 2009

(51) Int. Cl.
*H02J 9/00* (2006.01)
(52) U.S. Cl. .................................................. 307/64
(58) Field of Classification Search .................. 307/64
See application file for complete search history.

(56) References Cited

U.S. PATENT DOCUMENTS

| | | | |
|---|---|---|---|
| 4,508,974 A * | 4/1985 | Henderson | 307/66 |
| 4,760,277 A | 7/1988 | Vurpillat | |
| 4,779,007 A | 10/1988 | Schlanger et al. | |
| 5,369,561 A | 11/1994 | McCullough | |
| D354,267 S | 1/1995 | Severinsky | |
| 5,425,659 A | 6/1995 | Banks | |
| 5,434,769 A | 7/1995 | Severinsky | |
| 5,440,179 A | 8/1995 | Severinsky | |
| 5,458,991 A | 10/1995 | Severinsky | |
| 6,275,946 B1 * | 8/2001 | Meir | 713/300 |
| 7,259,476 B2 * | 8/2007 | Frey | 307/64 |
| 7,375,939 B2 | 5/2008 | Weil | |

OTHER PUBLICATIONS

Tripp-Lite Power Protection, AV550SC Backup Power Block, New Product Announcement Brochure, dated Aug. 2007, 2 pages.
Tripp Lite, Audio/Video Backup Power Bloc Model #AV550SC, http://www.tripplite.com/products/product.cfm?productID=3640, printed from website on Dec. 10, 2007, 4 pages.
Windows XP, Troubleshooting Network Connection Problems, available online at: <http://www.microsoft.com/windowsxp/using/networking/maintain/troubleshoot.mspx>, Microsoft Corporation, Aug. 15, 2006.
Windows XP, Troubleshooting Network Connection Problems, available online at: <http://www.microsoft.com/windowsxp/using/networking/maintain/troubleshoot.mspx>, Microsoft Corporation, 2009.

* cited by examiner

*Primary Examiner*—Robert L. Deberadinis
(74) *Attorney, Agent, or Firm*—Michael Best & Friedrich LLP

(57) ABSTRACT

An uninterruptible power supply having an input connector for receiving AC power from a centralized source of electric power such as a power grid of an electric utility company, a first electric outlet, and a second electric outlet for delivering AC power, a first switch for selectively allowing AC power therethrough to the first outlet, a second switch for selectively allowing AC power therethrough to the second outlet: and a controller operable to control the second switch so that AC power is delivered to the second outlet a predetermined amount of time after AC power is delivered to the first outlet (i.e., after a time delay).

19 Claims, 6 Drawing Sheets

AUDIO AND VIDEO BACK-UP POWER BLOCK

BACKGROUND

The present invention relates to uninterruptible power supplies used to supply power to electronic equipment, such as computers, communication devices, and the like.

Uninterruptible power supplies are designed to provide power to electrical and electronic equipment during power failures and, in many instances, to protect such equipment from fluctuations (such as under- and over-voltages) in power provided to them. In the specific case of a power failure (meaning the loss of electrical power from an electric utility company or other large scale provider of electricity) an uninterruptible power supply ("UPS") supplies power from one or more integrated batteries to the equipment connected to the UPS. Upon return of power from the electric utility company, the UPS generally returns to normal operation by supplying or relaying power from the utility company to the equipment connected to the UPS and recharging the batteries.

SUMMARY

Although the general purpose of a UPS is to maintain power to devices so that the operation of those devices can continue despite a loss of utility power, there are a number of reasons why devices connected to a UPS are shut down and kept off until utility power is restored. For example, as with any battery or similar storage device, the amount of power that can be stored by the batteries in a UPS and, thus, made available during an interruption of utility power is limited. As a consequence, it is sometimes necessary to shut down devices connected to a UPS when their batteries are near depletion. For example, some devices can be damaged when an abrupt cut off of power occurs. In another example, even though an interruption of utility power has not occurred, severe fluctuations (voltage or current) can damage equipment. Rather than rely on components in a UPS to fix those fluctuations, some equipment owners may chose to turn off their equipment until stable utility power is available.

Although current UPSs are capable of supplying backup power and at least some protection from power fluctuations to electrical devices, they often do not provide any solutions or assistance with problems than can occur when electric utility power returns and devices connected to the UPS that have previously been shut down are restarted or powered up. In the past, restarting devices after restoration of utility power required manual intervention.

Another problem not addressed by current UPSs relates to the sequence in which devices are restarted or turned back on. For example, it may be necessary to turn on a cable modem before turning on a computer or router so that the cable modem can obtain an Internet address before a user attempts to log on to the Internet using the computer.

In settings where technically trained individuals are available to attend to equipment after a power failure occurs it is possible to property restart or power-up equipment. However, in many circumstances, for example in homes and other residential properties, such technically trained people are not available. In addition, maintaining such as staff to respond to such events is costly.

One embodiment of the invention provides a backup power block that, among other things, is designed to be installed in a residential building, specifically within a structured wiring box that fits within the space between wall studs in a home or similar building. The backup power block also powers-up electronic equipment in an appropriate sequence for successful start up and operation of the equipment. The backup power block powers-up equipment automatically to substantially eliminate user interaction with the backup power block and/or equipment during the re-start process.

In another embodiment, the invention provides a UPS that includes an input connector for receiving AC power, a first outlet and a second outlet for delivering AC power, a first switch (e.g., a relay) for selectively allowing AC power therethrough to the first outlet, a second switch (e.g., a relay) for selectively allowing AC power therethrough to the second outlet, and a controller to control the second relay for the second outlet to deliver AC power subsequent to a time delay with respect to AC power delivered by the first outlet.

In another embodiment, the invention provides an uninterruptible power supply including an input connector for receiving AC power, a charger circuit coupled to the input connector and operable to produce a DC output, a battery coupled to the charger circuit, an inverter coupled to the battery and configured to produce AC power, a first electrical outlet for delivering AC power, a second electrical outlet for delivering AC power, a first switch for selectively coupling the first electrical outlet to the input connector and the inverter, a second switch for selectively coupling the second electrical outlet to the input connector and the inverter, and a controller configured to determine the existence of an interruption in a supply of AC power to the input connector, to detect the depletion of energy stored in the battery, to determine a restoration of the supply of AC power to the input connector, and to control the first switch and the second switch such that AC power is provided to the second electrical outlet a predetermined amount of time after AC power is provided to the first electrical outlet. The predetermined amount of time is equal to ten or more seconds, or a sufficiently long period of time to assure the proper start-up sequence of the attached equipment. DC power is also provided as an output through a switch that operates in tandem with the second switch. In one embodiment, the power supply provides DC power after a time delay.

In another embodiment, the invention provides a set of electronic elements for processing and providing surge and EMI protection for audio and video signals. The set of electronic elements includes a first electronic element operable to receive a data signal from a service provider, a second electronic element connected to the first electronic element, and an uninterruptible power supply for providing power to the first electronic element and the second electronic element. The uninterruptible power supply selectively supplies power to the second electronic element subsequent to a time delay with respect to the first electronic element to ensure proper system start up.

In another embodiment, the invention provides a method for operating an uninterruptible power supply having an input connector for receiving AC power, a first outlet and a second outlet for delivering AC power, a first relay for selectively allowing AC power therethrough to the first outlet, and a second relay for selectively allowing AC power therethrough to the second outlet. The method includes relaying AC power from the input connector to at least one of the first outlet and the second outlet, detecting a power failure condition, operating the first relay to continue supplying power from a battery to at least one of the first outlet and the second outlet, subsequently terminating power supply to the first outlet and second outlet as a result of depletion of the energy in the battery, detecting termination of the power failure condition, operating the first relay to supply AC power to the first outlet in response to detecting termination of the power failure condition, and operating the second relay to supply AC power to the second outlet subsequent to a time delay in response to detecting the termination of the power failure condition.

In another embodiment, the invention provides a method for operating an uninterruptible power supply having an input connector, for receiving AC power, a first outlet and a second outlet for delivering AC power, a first relay for selectively allowing AC power therethrough to the first outlet, a second relay for selectively allowing AC power therethrough to the second outlet, and a reset circuit. The method includes relaying AC power from the input connector to at least one of the first outlet and the second outlet, operating the reset circuit, operating at least one of the first relay and the second relay to temporarily interrupt power supplied in response to operating the reset circuit, operating the first relay to supply AC power to the first outlet in response to temporarily interrupting the power, and operating the second relay to supply AC power to the second outlet subsequent to a time delay in response to temporarily interrupting the power.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a UPS 10 (also referred to as a backup power block). As further explained below, the UPS 10 provides protection for structured cabling connections, such a telephone lines, Internet connections, cable, satellite, and TV connections, and the like. The UPS 10 provides battery backup power, power surge protection, and EMI/RFI filtering. The UPS 10 may be used with audio/video equipment, TV equipment, and network equipment such as modems, routers, network interfaces, and the like.

Figure 1:
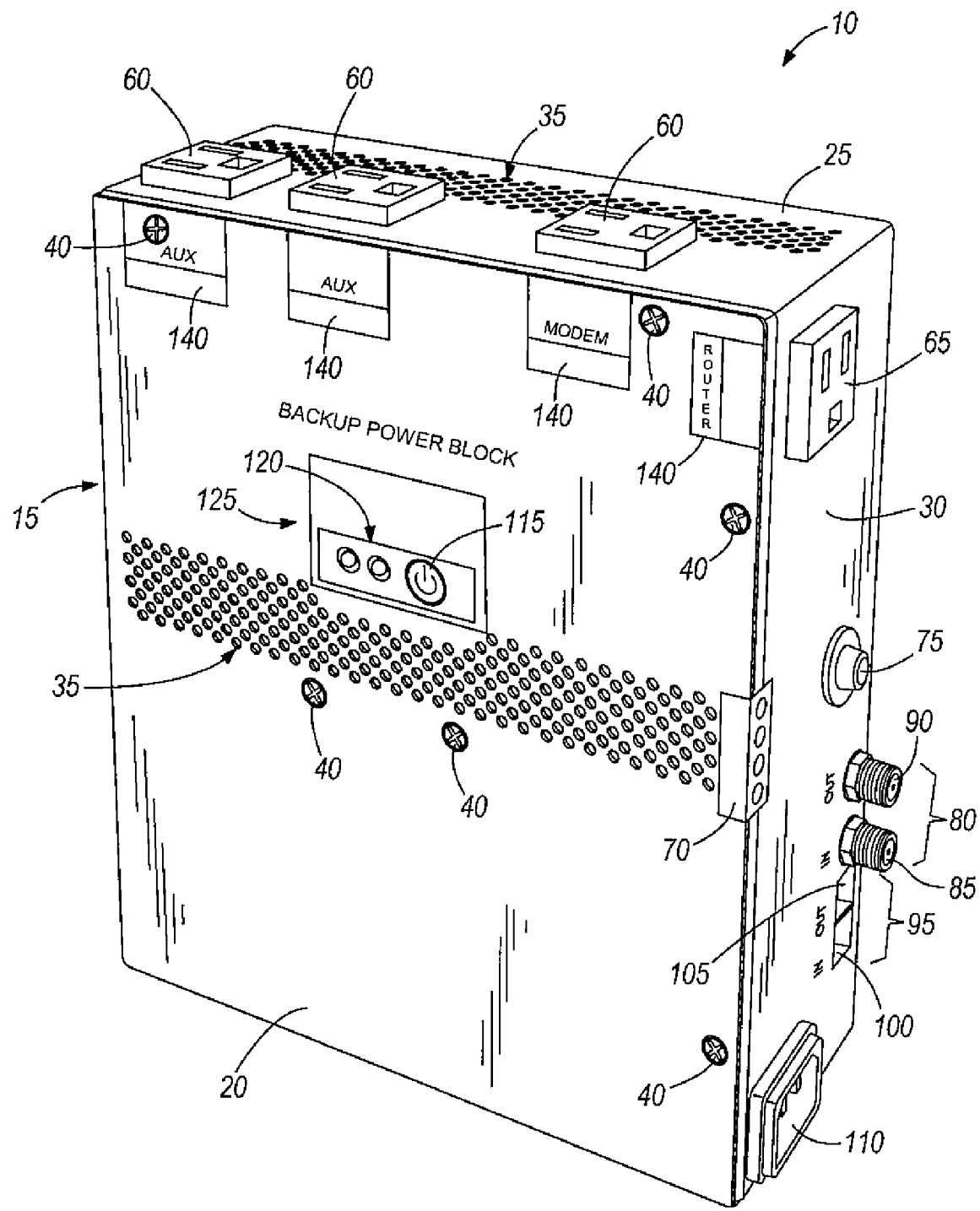
FIG. 1 is a perspective view of an uninterruptible power supply ("UPS") or backup power block according to one embodiment of the present invention.

With reference to FIG. 1, the UPS 10 includes a housing or case 15 having a front panel 20, a top panel 25, and a right panel 30 (with respect to FIG. 1). Though not shown in FIGS. 1-4, the case 15 also includes a rear panel, a left panel, and a bottom panel. In the illustrated construction, the front panel 20 and the top panel 25 each include ventilation apertures or openings 35. The ventilation openings 35 allow air to flow into and out of the case 15, which helps cool devices located within the case 15. The case 15 may include differently shaped and positioned as well as a different number of ventilation openings than those shown. Preferably, the case 15 is manufactured of metal, although other materials can be used. Using metal or other conductive material helps provide shielding from electromagnetic interference ("EMI") and noise. In addition, metal is relatively rigid, strong, and inexpensive and often provides a combination of cost and protection to internal components from physical damage that can not be matched by other materials.

In the illustrated construction, the top, bottom, right, left, and rear panels of the case 15 form a first single piece, and the front panel 20 forms a second single piece or cover. The second single piece is fastened to the first single piece by a number of fasteners 40 (six shown in FIG. 1), such as screws or bolts. Though other configurations are possible, it is preferred that the case 15 be sized and shaped to fit within a low-voltage, electric cabinet or panel (often referred to as a "structured wiring box") used in residential buildings. A structured wiring box is generally manufactured with the specific purpose of enclosing coaxial cable connections, Cat5E cable connections, control network equipment, and other electrical equipment. Structured wiring boxes are made by OnQ, Open House, Channel Vision, Hubbell, and other companies and are often designed to be flush mounted in building walls. Such panels may, for example, have exterior dimensions of about 14" (width)×32" (height)×3⅞" (depth). In one embodiment, the case 15 has dimensions of approximately 8" (width)×7" (height)×3" (depth). Thus, the case 15 can readily fit within a typical structured wiring box used in structured wiring applications.

Figure 2:
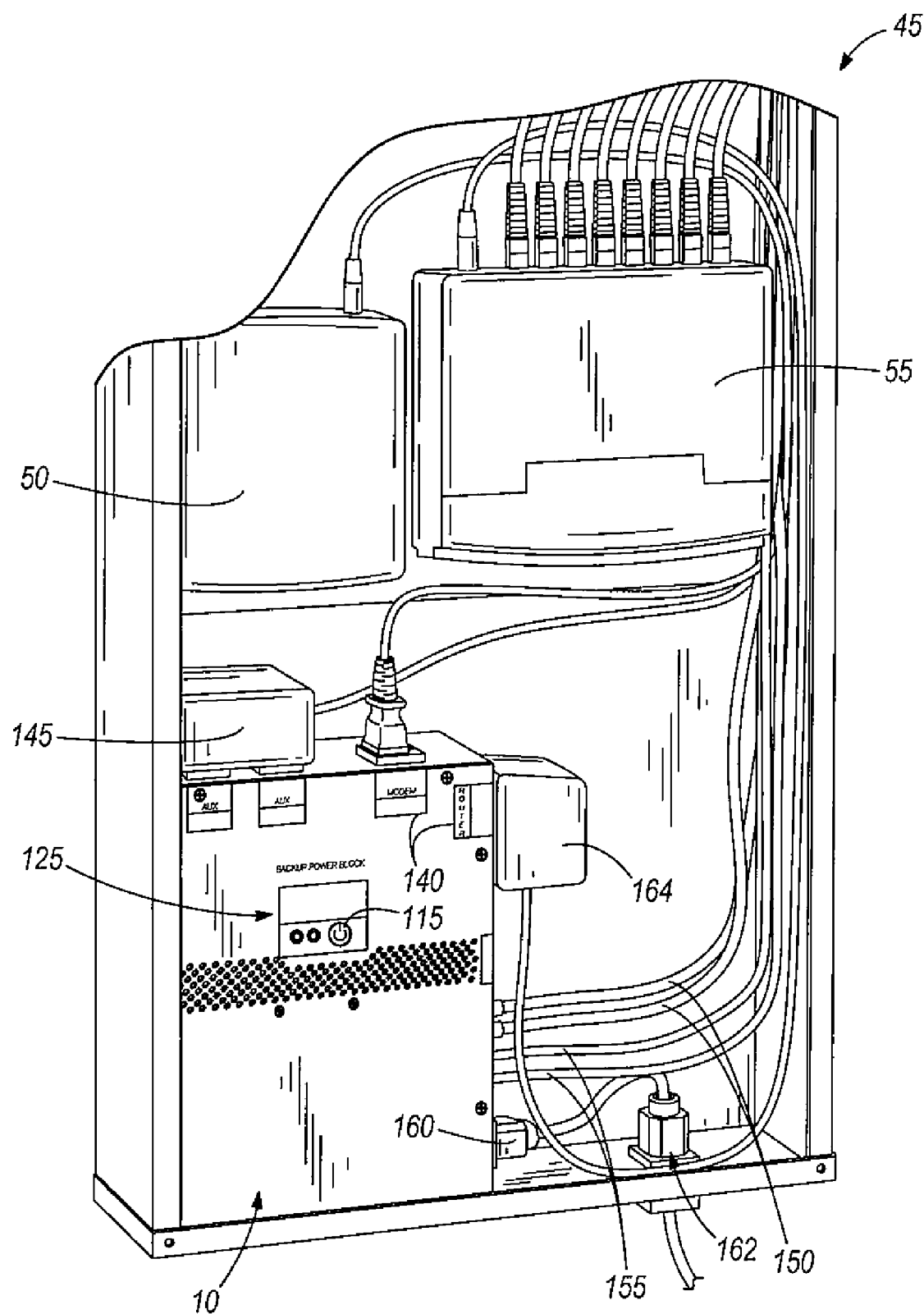
FIG. 2 is a partial perspective view of a structured wiring box including the backup power block of FIG. 1 connected to electronic equipment.

More recently, electric panels have been designed and used to enclose low-voltage communication and/or audio/video distribution equipment, such as modems, routers, and the like (examples of which are shown in FIG. 2) in addition to traditional equipment such as circuit breakers. FIG. 2 illustrates the UPS 10 mounted in a structured wiring box 45 along with a modem 50 and a router 55. The structured wiring box 45 is manufactured with the specific purpose of being used in homes and similar structures. Accordingly, the structured wiring box 45 is generally designed to fit between wall studs or other locations in homes and similar buildings.

The relatively small footprint of the UPS 10 in comparison to other UPS devices is the result, at least in part, of the use of high-frequency electronics as opposed to low-frequency electronics. Low-frequency electronics are generally larger and bulkier in comparison to high-frequency electronics. In one embodiment, a high-frequency AC/DC transformer circuit and a DC/AC transformer circuit are used. The use of these circuits allows the UPS 10 to include a power backup feature including the provision of both AC and DC backup power.

By providing a DC outlet (e.g., the outlet 70) the need for transformers outside of the UPS 10 is reduced because DC-powered devices can be connected to the outlet 70 instead of connecting a relatively bulky transformer (such as the two shown in FIG. 2 and described below) to an AC outlet and powering a DC-powered device from the transformer.

Additional benefits that are achieved by the use of high-frequency electronics include reduced cost and reduced heat. Low-frequency electronics tend to be more expensive. Therefore, the use of high-frequency components helps in keeping the cost of the UPS 10 relatively low. Low-frequency electronics also have a tendency to generate more heat than high-frequency electronics. Thus, the use of high-frequency electronics helps reduce the generation of heat. Reducing the overall number of transformers in the structured wiring box 45 also help reduce heat and EMI.

With reference to FIG. 1, the UPS 10 includes three (3) AC-outlets 60 located alone the top panel 25. The UPS 10 also includes a delay-on AC-outlet 65, a DC-outlet 70, a re-settable circuit breaker switch 75, a high-definition ("HD") compatible set of coaxial-cable connectors 80 including an input connector 85 and an output connector 90, a set of data ports 95 including an input port 100 and an output port 105 for telephone, modem, DSL, Ethernet lines, and other connections, and an International Electrotechnical Commission ("ICE") 320-C14 power input connector 110 located along the right panel 30. The UPS 10 also includes a recycle/reset switch (which in the embodiment shown is also an on/off switch) 115 and two (2) LEDs 120 accessible through an interface portion 125 of the UPS 10.

The UPS 10 also includes labels 140 (in the illustrated construction the labels are "AUX," "AUX," "MODEM," and "ROUTER"). The labels 140 are placed on the front panel 20 and provide information to the user regarding the name of the particular piece of equipment connected to the outlet and the appropriate use of the AC-outlets 60 and 65 for powering electronic equipment in the electric panel 45. As shown in FIGS. 1 and 2, one AC-outlet 60 is designated for powering, for example, the modem 50 (a device that should be powered on or up prior to other devices), and the delay-on AC-outlet 65 is designated for powering the router 55 (a device that should be powered on after the device connected to the outlet 60 is powered up). Also shown in FIG. 2 are a transformer 145 connected to one AC-outlet 60 (with the indicator 140 labeled "AUX"), coaxial cables 150 connected to coaxial cable connectors 80, Ethernet cables 155 connected to the set of data ports 95, and a power cable 160 connected oil one end to the input connector 110 and on the opposite end to an outlet 162 built in the structured wiring box 45 and connected to all AC power source. A second transformer 164 is connected to another one of the AC outlets 60 with the indicator labeled "ROUTER."

The UPS 10 is configured to 1) relay power from the input connector 110 to the AC-outlets 60 and 65, 2) help prevent damage to electronic equipment (e.g., modem 50, router 55) that may result from short-term power failure and/or power glitches (e.g., power spikes), and 3) manage a power-up sequence of electronic equipment after a "long-term power failure." Generally, a "short-term power failure" refers to a loss of utility power for an amount of time less than the discharge time (or "life") of the batteries used in the UPS 10. A "long-term power failure" extends beyond the discharge time of the batteries. In one embodiment, the UPS 10 has batteries configured to supply 550/300 VA/Watts of backup power.

In some embodiments, when a short-term power failure occurs or power glitches or fluctuations occur the UPS 10 is programmed to 1) provide an indication to a person that interruptions or fluctuations are occurring so that the user may manually shut down the equipment if the user determines or believes that shutting down the equipment will prevent damage to the equipment, or 2) automatically shut down the components connected to it and then automatically restart them after a period of steady supply of utility power.

In addition, the UPS 10 is programmed so that if the batteries of the UPS 10 have been used to power equipment connected to the UPS 10 for an amount of time that approaches the life of the batteries (as a result of a long-term power failure), an automatic shut-down of the electronic equipment (if a user has not done so prior to the batteries becoming depleted) is performed. When utility power is restored, an automatic (sequenced) restart is initiated.

In an example where the UPS 10 is connected to the modem 50 and the router 55, the UPS 10 relays utility power to these components so long as the utility power being supplied falls within predetermined parameters. If a long-term power failure occurs, the modem 50 and router 55 are automatically shut down. When utility power is restored, the UPS 10 directs power to the modem 50 before powering the router 55. A delay circuit (FIGS. 3 and 4A) prevents the UPS 10 from relaying power from the input connector 110 to the AC-outlet 65 prior to a predetermined delay (which in one embodiment is a 60-second delay). The delay allows the modem 50 to receive an IP address from an Internet provider prior to activation of the router 55. This start up sequence ensures that the modem 50 and router 55 are properly synchronized and particularly that the modem 50 has an IP address prior to receiving a request from the router 55 for such an address. A concurrent or reversed start-up sequence of the devices would likely cause a synchronization failure. As noted, the amount of the predetermined delay provided by the delay circuit 230 can be approximately 60 seconds or one minute. This value is based on the time it currently takes electronic devices to reboot and, in the instance of a modem, acquire an Internet address with some added time to provide a margin of error or safety. Based on their current knowledge, the inventors believe that the minimum amount of delay needed to accomplish sequenced restarting of devices connected to the UPS 10 is about 10 seconds, with a delay of a shorter period of time probably impractical based on current technology.

The initiation of a start-up sequence may also be accomplished manually by pressing the on/off switch 115 while the UPS 10 normally receives power through the input connector 110. For example, one construction of the UPS 10 can include pressing the oil/off switch 115 twice (off and then on). Reasons why a user would choose to press the on/off switch 115 of the UPS 10 include a loss of connectivity via the coaxial cable connectors 80 and loss of signal or connectivity through the data ports 95 due to a failure in the equipment at the facilities of a communications service provider.

Figure 3:
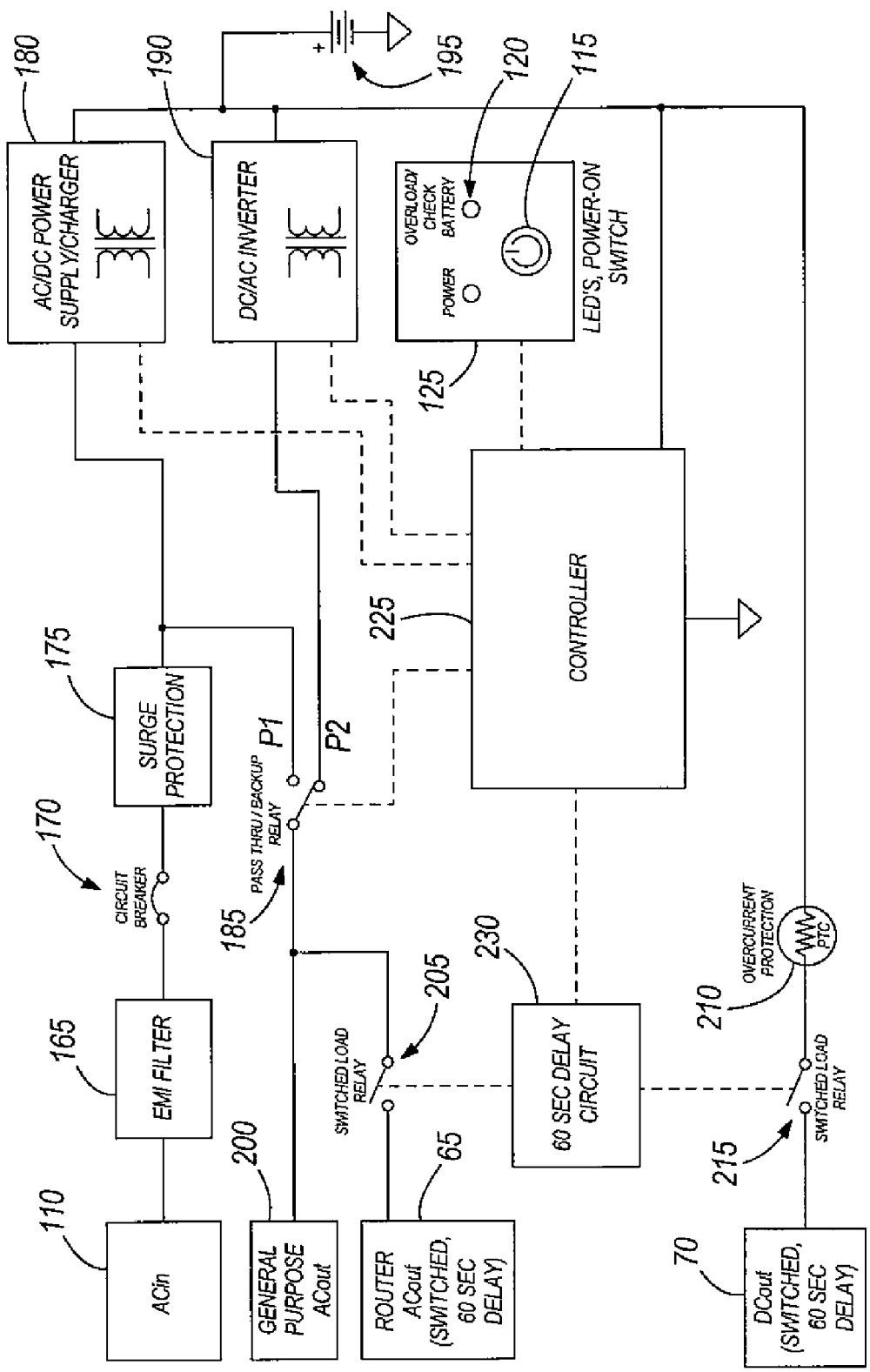
FIG. 3 is a block diagram of the backup power block of FIG. 1.

FIG. 3 is a block diagram of the UPS 10 and illustrates the majority of the components of the UPS 10. The UPS 10 includes the input connector 110, an EMI filter 165, and a circuit breaker 170, which is connected to the circuit breaker switch 75 (FIG. 1). The circuit breaker 170 is connected to a surge protection device 175. The surge protection device 175 is connected to an AC/DC Power Supply/Charger 180 and to a pass-through/backup switch 185, which is movable between two positions: P1 and P2. The pass-through/backup switch 185 is connected to a DC/AC Inverter 190. A battery 195 is connected to the AC/DC Power Supply/Charger 180 and the DC/AC inverter 190. The pass-through/backup switch 185 is also connected to a general purpose electrical outlet 200 (one of the outlets 60), and a second switch 205. The second switch 205 is connected to the delay-on AC-outlet 65. The AC/DC Power Supply/Charger 180 and DC/AC Inverter 190 are connected to a resettable, positive temperature coefficient thermistor ("PTC") 210. The PTC 210 is connected to a third switch 215. The third switch 215 is connected to the DC output port or outlet 70.

A controller 225 controls the pass-through/backup switch 185, and is connected to a delay circuit 230. The delay circuit 230 is connected to the second and third switches 205 and 215. The controller 225 is also connected to the interface 125, the DC/AC inverter 190, and the AC/DC Power Supply/

Charger 180. In an alternative construction of the UPS 10, the functions of the delay circuit 230 can be integrated into the controller 225.

During normal operation of the UPS 10, power supplied via the input connector 110 flows through the EMI and noise filter 165, the circuit breaker 170, and surge protection circuit 175 to the general purpose electrical outlet 200. The switch 185 is controlled by the controller 225 so that power is supplied from either the utility source connected to the input connector 110 or the battery 195 (through the DC/AC inverter 190).

The second switch 205 and the third switch 215 are controlled by the delay circuit 230. When the second switch 205 is closed, power is provided to the delay-on AC outlet 65. The third switch 215 controls power to the DC-outlet 70.

When a power failure occurs, the controller 225 sends a control signal to the pass-through/backup switch 185 to move the switch 185 to position P2. As a result, power from the battery 195 is supplied (through the DC/AC Inverter 190) to the outlet 200.

If devices connected to the outlets 65 and 200 are powered off due to an interruption in power sufficiently long to deplete the battery 195, such devices are turned on when utility power is restored. The controller 225 generates a control signal to change the position of the switch pass-through/backup switch 185 from P2 to P1 so that power is provided to the outlet 200 from the electricity source coupled to the input connector 110. The controller 225 also sends a control signal to the delay circuit 230 such that the second and third switches 205 and 215 are not closed until a predetermined delay (usually ten seconds or more and, in the embodiment shown, 60 seconds) has occurred. So controlled, power is provided to the outlet 200 prior to being provided to the delay-on AC outlet 65 and the DC outlet 70. The battery 195 is also recharged by the output of the AC/DC Power Supply/Charger 180 as a result of power being restored.

Figure 4A:
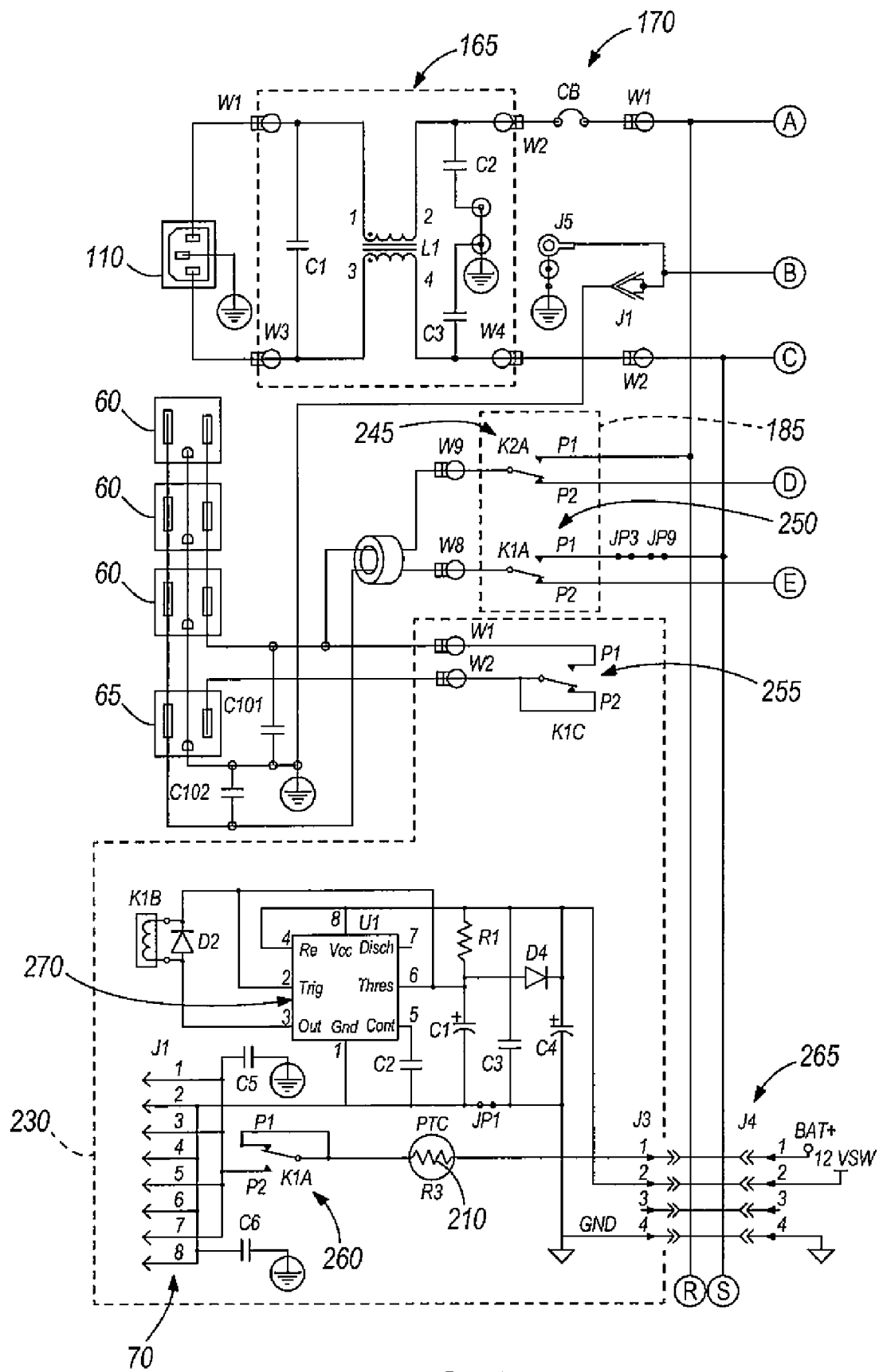
FIG. 4A illustrates a first portion of a circuit diagram of the backup power block in FIG. 1.

FIGS. 4A-4E provide additional details regarding the circuits and components in the UPS 10. With reference to FIG. 4A, the UPS 10 includes the input connector 110 for receiving input power. The EMI and noise filter circuit 165 and the circuit breaker 170 are coupled to the input connector 110. The filter 165 reduces noise in the input power and the circuit breaker 170 opens upon the occurrence of an overload. In an alternative construction, the UPS 10 can include double pole relays to perform the operations of the circuit breaker 170, for example. The UPS 10 also includes the AC-outlets 60, the delay-on AC-outlet 65, and a first relay 245 and a second relay 250 of the pass-through backup switch 185.

Each of the relays 245 and 250 is movable from a first position (P1) to a second position (P2). When each of the relays is in the first position P1, power is supplied from the electric utility company via the input connector 110. When each of the relays in the second position P2, power is supplied (via the DC/AC inverter 190) from the battery 195. As further described below, the controller 225 (FIGS. 3 and 4E) controls the relays 245 and 250. When a power failure occurs, the controller 225 sends a control signal to the relays 245 and 250 so that power from the battery 195 is supplied (after passing through the DC/AC inverter 190) to the AC outlets 60 and to the delay-on AC outlet 65.

As shown in FIG. 4A, the delay circuit 230 includes a third relay 255 of the second switch 205. The relay 225 is electrically connected to the AC-outlets 60 and 65. The delay circuit 230 also includes a fourth relay 260 of the third switch 215 connected to the DC-outlet 70. The delay circuit 230 is connected to the controller 225 via a set of connectors 265. The delay circuit 230 includes a controller 270 for providing a calculated or predetermined time delay (for example 60 seconds) under reset or power failure conditions. The delay circuit 230 controls the third and fourth relays 255 and 260 for selectively supplying power to the outlets 65 and 70. In other constructions, the UPS 10 includes double pole relays for performing the operations of relays 255 and 260.

During normal operation of the UPS 10, relay 255 in cooperation with relays 245 and 250 allows power supplied to the UPS 10 via the input connector 110 to flow to the delay-on AC outlet 65 (via the EMI and noise filter 165). In addition, relay 260 allows the flow of a DC voltage supplied from the battery 195 via the connectors 265 and the PTC 210 to the DC-outlet 70. The PTC 210 provides protection to the DC-outlet 70, and therefore electronic equipment connected thereto, from a short circuit and overloads.

When a power failure occurs, the relays 245 and 250 are switched to position P2 to permit power from the battery 195 to be inverted and supplied to the outlets 65 and 70. If the power outage is long enough to deplete the battery 195, the DC/AC inverter 190 turns off resulting in no power being transmitted to the outlets 65 and 70. When normal utility power is restored or the on/off switch 115 is pressed, the controller 225 changes the position of relays 255, 260 to position P1 so that power from the input connector 110 is available. The delay circuit 230 causes power to be available at the outlets 65 and 70 following a 60-second time delay.

Figure 4B:
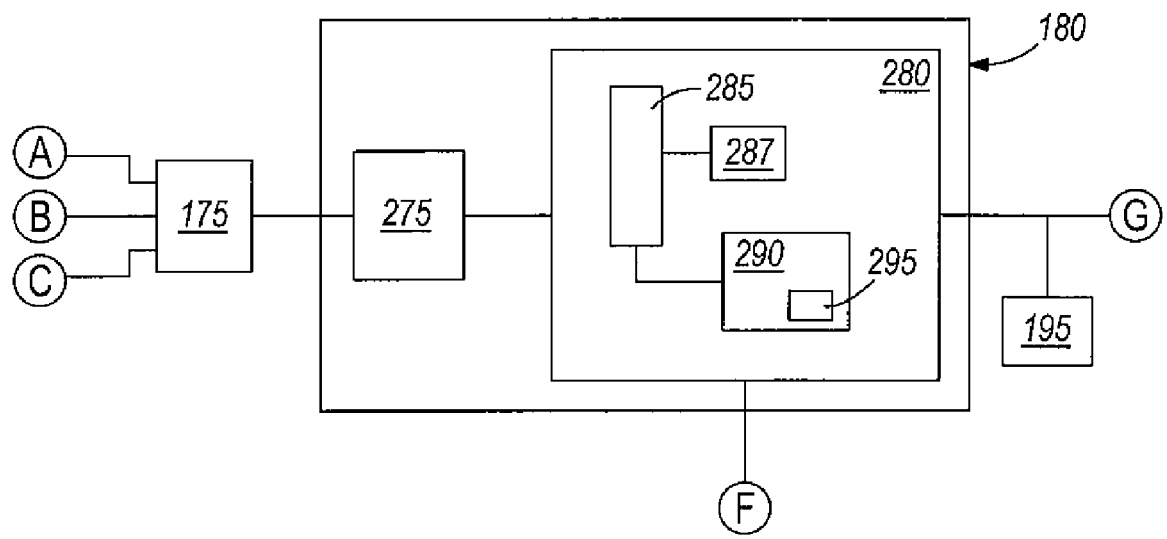
FIG. 4B illustrates a second portion of a circuit diagram of the backup power block in FIG. 1.

With reference to FIG. 4B, the UPS 10 includes the surge protection circuit 175 and the AC/DC Power Supply/Charger circuit 180. The AC/DC Power Supply/Charger circuit 180 includes a rectifier circuit 275, a battery charger circuit 280 with a transformer 285, an output rectifier 287, and a controller circuit 290 with a controller 295. The surge protection circuit 175 conditions the power supplied via the input connector 110 by clamping excess AC voltage therethrough. The battery charger circuit 280 transforms AC power to DC voltage. The battery 195 is connected to the battery charger circuit 280 and receives the DC voltage. The battery 195 is discharged when interruptions in utility company power occur. The controller circuit 290 controls charging of the battery 195.

Figure 4C:
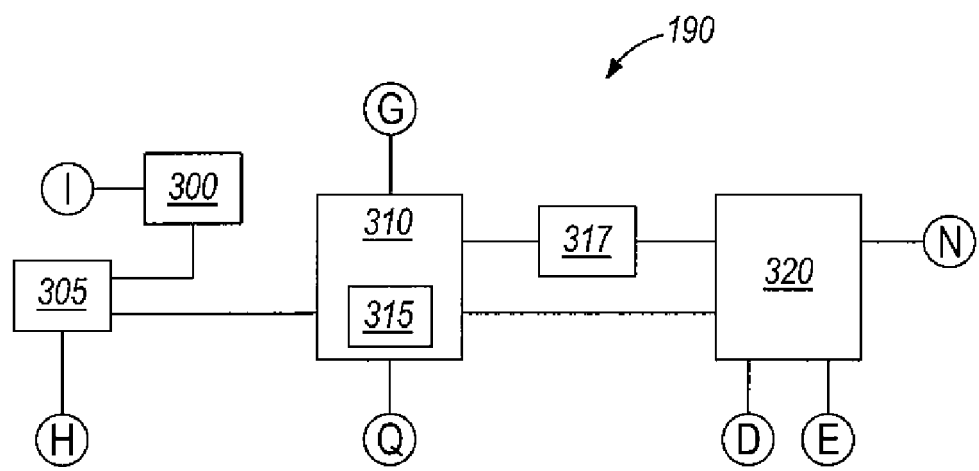
FIG. 4C illustrates a third portion of a circuit diagram of the backup power block in FIG. 1.

With reference to FIG. 4C the DC/AC inverter circuit 190 includes a pulse width modulation control circuit 300 connected to a controller 305, an inverter circuit 310 with a transformer 315, a rectifier circuit 317, and an AC output circuit 320. During a power failure, the DC/AC inverter circuit 310 and the AC output circuit 320 receive a DC voltage from the battery 195 and transform the DC voltage into AC power. The AC power generated by the DC/AC inverter circuit 310 and the AC output circuit 320 is supplied to the AC-outlets 60 through relays 245 and 250. The AC power generated by the DC/AC inverter circuit 310 and the AC output circuit 320 is also supplied to the delay-on AC outlet 65 through relay 255 in cooperation with relays 245 and 250.

Figure 4D:
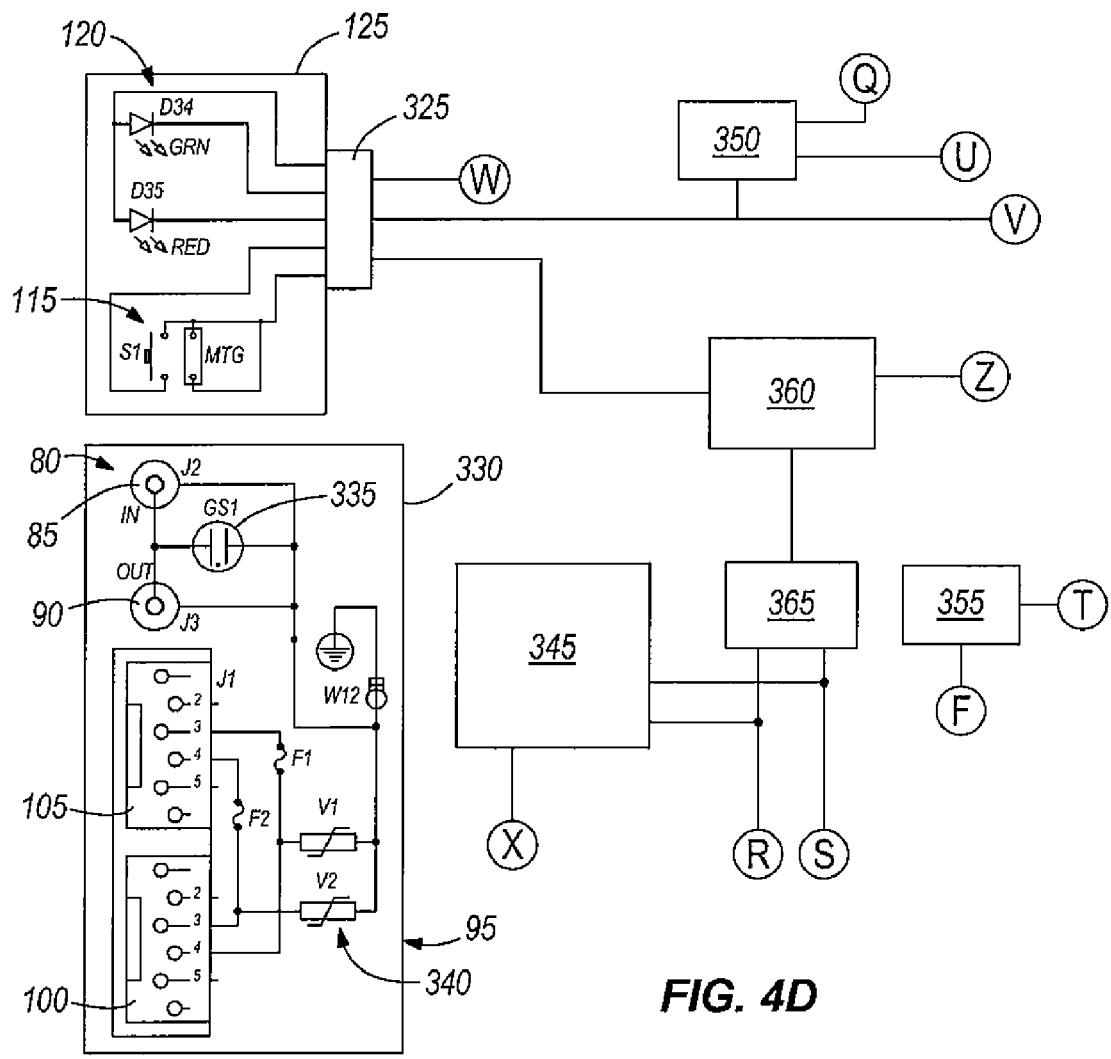
FIG. 4D illustrates a fourth portion of a circuit diagram of the backup power block in FIG. 1.

As shown in FIG. 4D, the UPS 10 includes the interface 125 having two LEDs 120 and the oil/off switch 115. The LEDs 120 and the interface switch 115 are connected to the controller 225 via connectors 325. In the illustrated construction, the LEDs 120 include a green LED and a red LED to indicate the status of the UPS 10 (supply power from the electric utility company or from the battery 195 and/or fault conditions). The UPS 10 also includes a data interface 330, which includes the coaxial connectors 80, a surge suppressor 335 connected to the input and output jacks 85 and 90, the set of data ports 95, and a surge protection circuit 340. The surge protection circuit 340 is connected to the input port 100 and the output port 105. The surge suppressor 335 and the surge protection circuit 340 protect electronic equipment from a power surge via data lines (e.g., Ethernet and/or coaxial lines). In certain embodiments, the UPS 10 can monitor activity via the coaxial connectors 80 and the data ports 95 so that the UPS 10 automatically shuts down and/or restarts equipment connected to the UPS 10 via the coaxial ports 80 and/or data ports 95 when network connectivity is lost.

The UPS 10 also includes a voltage measuring circuit 345, a relay driver circuit 350, a charger control circuit 355, and a keep live circuit 360. The voltage measuring circuit 345 receives AC power from the input connector 110 and processes the AC power input during normal operating conditions of the UPS 10. As a result of processing the AC power input, the voltage measuring circuit 345 generates at least one signal indicative of the AC power input and sends the at least one signal to the controller 225 (FIG. 4E) for analysis. For example, the voltage measuring circuit 345 can generate a signal indicative of the RMS voltage and a logic level output signal indicative of AC voltage zero crossings. The controller 225 is electrically connected to the relay driver circuit 350 and to the LEDs 120. The controller 225 operates the LEDs 120 for visual indication of the status of the UPS 10.

The charger control circuit 355 is connected to the controller 225 and to the AC/DC Power Supply/Charger circuit 180 (FIGS. 3 and 4B). The charger control circuit 355 delivers a signal from the controller 225 to the AC/DC Power Supply/Charger circuit 180 to charge the battery 195. For example, the signal delivered by the charger control circuit 355 can indicate to the AC/DC Power Supply/Charger circuit 180 whether the battery 195 should be charged to the acceptance voltage or to the float voltage for most efficient and rapid charging. During a charging operation, the controller 225 generally switches from the higher acceptance voltage to the lower float voltage to keep the battery 195 charged for a substantially indefinite period of time. Other control and/or status signals may be delivered by the charger control circuit 355.

The keep alive circuit 360 is designed to maintain the UPS 10 operational during a power failure condition, for example. In the case of a long-term power failure (as described above), the battery 195 is generally depleted due to the length of the power outage. The keep alive circuit 360 allows the UPS 10 to proceed with a self-shut-down routine. Upon return of the power supply via the input connector 110, a restart circuit 365 provides a restart signal to the keep alive circuit 360 and reinitiates operation of the controller 225. In other words, the UPS 10 includes an auto restart feature that allows the UPS 10 to start normal operation after a power failure automatically and without interaction from a user.

Figure 4E:
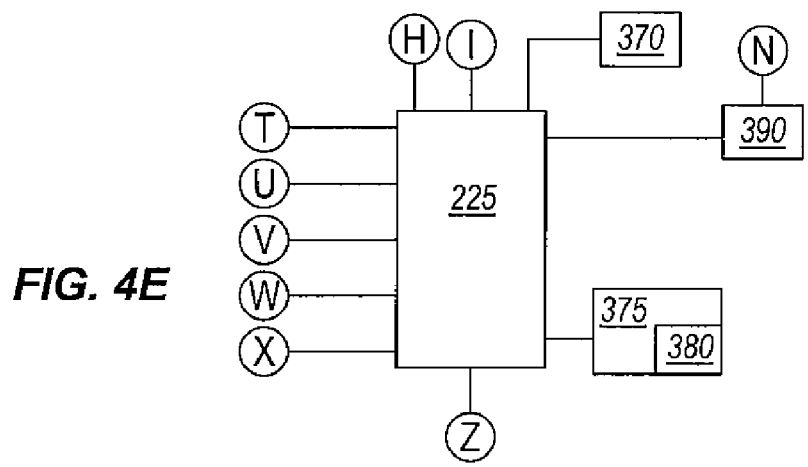
FIG. 4E illustrates a fifth portion of a circuit diagram of the backup power block in FIG. 1.

As shown in FIG. 4E, the UPS 10 also includes a memory 370 connected to the controller 225, a USB circuit 375 with a USB port 380, and an AC output driver circuit 390. In one embodiment, the memory 370 is an EEPROM memory and is used to save settings of the UPS 10. The AC output driver circuit 390 is connected between the controller 225 and a section of the AC output circuit 320. The AC output driver circuit 390 allows the controller 225 to operate and monitor the AC power output generated by the AC output circuit 320.

The USB circuit 375 is utilized during the manufacturing process to program the controller. It can also be used for repair and reprogramming purposes. In the embodiment shown, the USB port 380 is not intended to be accessed or used by a user. However, in alternative embodiments the case 15 and UPS 10 could be modified to permit user access to the USB port 380.

Various features and advantages of the invention are set forth in the following claims.

What is claimed is:

1. An uninterruptible power supply comprising:
an input connector for receiving AC power;
a charger circuit coupled to the input connector and operable to produce a DC output;
a battery coupled to the charger circuit;
an inverter coupled to the battery and configured to produce an AC power;
a first electrical outlet for delivering AC power;
a second electrical outlet for delivering AC power;
a first switch for selectively coupling the first electrical outlet to the input connector and the inverter;
a second switch for selectively coupling the second electrical outlet to the input connector and the inverter;
a controller configured to determine the existence of an interruption in a supply of AC power to the input connector, to detect the depletion of energy stored in the battery, to determine a restoration of the supply of AC power to the input connector, and to control the first switch and the second switch such that AC power is provided to the second electrical outlet a predetermined amount of time after AC power is provided to the first electrical outlet, the predetermined amount of time equal to ten or more seconds; and
a housing configured to fit within a structured wiring box, wherein the housing encloses the charger circuit, the battery, the inverter, the first switch, the second switch, and the controller.

2. The uninterruptible power supply system of claim 1, further comprising:
a DC-outlet connected to the charger circuit, and
a third switch between the DC-outlet and the charger circuit, wherein the controller is operable to control the third switch to deliver a DC voltage to the DC-outlet subsequent to the predetermined amount of time.

3. The uninterruptible power supply of claim 1, further comprising
an EMI and noise filter circuit, and
a resettable circuit breaker connected in line with the EMI and noise filter circuit.

4. The uninterruptible power supply circuit of claim 3, wherein the filter circuit and the circuit breaker are connected between the input connector and the first switch.

5. The uninterruptible power supply of claim 1, further comprising
a plurality of data ports including an input port and an output port, and
a surge protector circuit connected between the input port and the output port, the surge protector circuit operable to prevent signal surges from flowing through the plurality of data ports.

6. The uninterruptible power supply system of claim 1, the housing is configured to fit within a structured wiring box having a depth, a height, and a width, and wherein the depth is less than four inches.

7. The uninterruptible power supply system of claim 1, wherein the predetermined amount of time is equal to 30 or more seconds.

8. A system for providing power to networking devices within a home, the system comprising:
a structured wiring box having a structured housing;
a modem having a power cord and positioned within the structured housing;
a router having a power cord and positioned within the structured housing, the second networking device dependent upon information made available from the first networking device;

an uninterruptible power supply positioned within the structured housing, the uninterruptible power supply including
an input connector for receiving AC power;
a charger circuit coupled to the input connector and operable to produce a DC output;
a battery coupled to the charger circuit;
an inverter coupled to the battery and configured to produce AC power;
a first electrical outlet for delivering AC power;
a second electrical outlet for delivering DC power;
a first switch for selectively coupling the first electrical outlet to the input connector and the inverter;
a second switch between the second electrical outlet and the charger circuit; and
a controller configured to determine the existence of an interruption in a supply of AC power to the input connector, to detect the depletion of energy stored in the battery, to determine a restoration of the supply of AC power to the input connector, and to control the first switch and the second switch such that DC power is provided to the second electrical outlet a predetermined amount of time after AC power is provided to the first electrical outlet,
wherein the power cord of the modem is connected to the first electrical outlet of the uninterruptible power supply and the power cord of the router is connected to the second electrical outlet of the uninterruptible power supply, and
wherein providing DC power to the second electrical outlet a predetermined amount of time after AC power is provided to the first electrical outlet enables the modem to receive an IP address from an Internet provider before the second electrical output provides power to the router.

9. The system of claim 8, wherein the uninterruptible power supply includes a reset circuit operable to control the uninterruptible power supply to interrupt power supply to the router and the modem.

10. The system of claim 8, further comprising
an EMI and noise filter circuit, and
a resettable circuit breaker connected in line with the EMI and noise filter circuit.

11. The system of claim 10, wherein the filter circuit and the circuit breaker are connected between the input connector and the first switch.

12. The system of claim 8, further comprising
a plurality of data ports including an input port and an output port, and
a surge protector circuit connected between the input port and the output port, the surge protector circuit operable to prevent signal surges from flowing through the plurality of data ports.

13. The system of claim 8, wherein the uninterruptible power supply includes a housing configured to fit within the structured wiring box, and wherein the housing of the uninterruptible power supply encloses the charger circuit, the battery, the inverter, the first switch, the second switch, and the controller.

14. The system of claim 8, further comprising:
a third electrical outlet for delivering AC power, and
a third switch for selectively coupling the third electrical outlet to the input connector and the inverter, wherein the controller is operable to control the third switch to deliver AC power to the third electrical outlet subsequent to the predetermined amount of time.

15. A method for operating an uninterruptible power supply, the method comprising:
connecting an input connector to a source of AC power;
connecting a charger circuit to the input connector;
connecting a battery to the charger circuit;
connecting an inverter to the battery;
selectively connecting a first electrical outlet configured to deliver AC power to the input connector and the inverter through a switch;
selectively connecting a second electrical outlet configured to deliver AC power to the input connector and the inverter through a second switch;
connecting a controller to the first switch and the second switch; and
configuring the controller to determine the existence of an interruption in a supply of AC power to the input connector, to detect the depletion of energy stored in the battery, to determine a restoration of the supply of AC power to the input connector, and to control the first switch and the second switch such that AC power is provided to the second electrical outlet a predetermined amount of time after AC power is provided to the first electrical outlet, thereby providing power to the first and second electrical outlets in a predetermined sequence,
wherein providing power in the predetermined sequence enables a first device connected to the first electrical outlet to power up and obtain an IP address before power is provided to the second electrical outlet.

16. The method of claim 15, further comprising
connecting a third switch to the charger circuit;
operating the third switch to supply DC voltage to a DC-outlet the predetermined amount of time after detecting restoration of the supply of AC power.

17. The method of claim 15, wherein the predetermined amount of time is equal to 30 or more seconds.

18. A method for operating an uninterruptible power supply including an input connector for receiving AC power, a first outlet and a second outlet for delivering AC power, a first relay for selectively allowing AC power therethrough to the first outlet, a second relay for selectively allowing AC power therethrough to the second outlet, and a reset circuit, the method comprising:
relaying AC power from the input connector to at least one of the first outlet and the second outlet;
operating the reset circuit;
operating at least one of the first relay and the second relay to temporarily interrupt power supply in response to operating the reset circuit;
operating the first relay to supply AC power to the first outlet in response to temporarily interrupting power supply; and
operating the second relay to supply AC power to the second outlet subsequent to a time delay in response to temporarily interrupting power supply.

19. The method of claim 18, further comprising transforming AC power to a DC voltage, operating a third relay to supply the DC voltage to a DC-outlet subsequent to the time delay in response to temporarily interrupting power supply.

* * * * *